United States Patent Office 2,987,401
Patented June 6, 1961

2,987,401
COMPOSITION AND METHOD FOR INHIBITING DISCOLORATION OF CUT ORGANIC MATERIALS
Carter D. Johnston, Fairfax County, Va., and McCalip J. Thomas, Macon County, Ill.
No Drawing. Filed Dec. 11, 1957, Ser. No. 701,978
4 Claims. (Cl. 99—154)

This invention relates to novel compositions of matter and the use thereof to inhibit or suppress the discoloration of fruits, vegetables and other organic materials of either vegetable or animal origin which normally occurs when their cut tissues are exposed to the air. In particular, it relates to novel acid calcium salts of phytic acid and the use of these salts to inhibit the discoloration of organic materials.

The discoloration of trimmed cauliflower, celery, rutabagas, and head lettuce is well known. Equally well known is the browning or darkening of peeled apples, peaches, and potatoes when exposed to the air. Highly colored fruits such as cherries and strawberries also darken or discolor noticeably when their tissues are broken and exposed to the air. This latter darkening occurs, for example, during storage of the frozen fresh fruit.

The detailed mechanism of the chemical reaction responsible for discoloration may vary with the product, but it is generally accepted that the cutting of the tissues releases enzymes which promote the air oxidation of tannins and other polyphenols present in the tissues to colored substances.

Vitamin C (1-ascorbic acid) has long been used to preserve the original color and flavor of many frozen fruits, particularly apples, peaches, and apricots. It blocks the normal enzyme oxidation of the oxidizable polyphenols in the fresh fruit. Vitamin C is also used as an antioxidant in the canning of fruits, mushrooms, fruit juices, milk, beer, fresh sauerkraut, pickles, cured meats and beverage bases.

Sulfur dioxide and its salts such as sodium sulfite and sodium bisulfite have also been used to suppress the discoloration of fruits and vegetables. For example, such use is described in United States Patent 2,628,905.

More recently, it has become known that soluble phytates, including free phytic acid, will inhibit the air discoloration of cut fruits and vegetables. However, this use of free phytic acid and its normal soluble salts may be regarded by some as nutritionally objectionable because of the known calcium binding property of phytic acid. According to this view, unless equivalent amounts of calcium are consumed at the same time, the eating of fruits and vegetables treated with phytic acid or normal soluble phytate is a step in the direction of depleting bones and teeth of essential calcium.

Prior efforts to combine, in solution or in dry form, the discoloration-inhibiting property of phytic acid and the necessary amount of calcium ion have been unsuccessful. The addition of calcium bases to solutions of free phytic acid or the addition of soluble calcium salts to solutions of free phytic acid or the addition of soluble calcium salts to solutions of soluble phytate, such as sodium phytate, yield copious precipitates of insoluble calcium phytate. Insoluble calcium phytate does not suppress the discoloration of cut fruits and vegetables exposed to the air.

A broad object of our invention is to provide novel compositions of matter which will suppress the discoloration of cut fruits and vegetables and other organic materials occurring when their cut tissues are exposed to the air.

Another object of our invention is to provide water soluble compositions of matter for suppressing the discoloration of cut organic materials, chiefly fruits and vegetables, which compositions contain phytic acid as the essential discoloration-inhibitor, and are further characterized by containing about six atoms of calcium per molecule of phytic acid.

A further object of our invention is to provide novel methods of preparing the aforementioned water soluble compositions of matter.

A still further object of our invention is to provide convenient methods of applying the novel compositions to cut fruits and other organic materials.

Additional objects and advantages of our invention will become apparent from the following description and illustrative examples.

We have discovered two general methods for preparing edible water soluble phytate compositions containing about six atoms of calcium per molecule of phytic acid. One is to dissolve calcium phytate in aqueous solutions of selected edible acids. The other is to dissolve the calcium salts of the edible acid in aqueous solutions of phytic acid. The first method has the advantage of automatically providing calcium equivalent to the phytic acid. Obviously, the same final product or composition can be made by either method. Among the food acceptable acids capable of dissolving calcium phytate to a useful concentration of the acid salts are hydrochloric, phosphoric, citric, lactic, malic, tartaric, maleic, and malonic. Conversely, water solutions of phytic acid will dissolve to a substantial extent the calcium salts of the foregoing acids. The maximum concentration of a solution stable at a given temperature (e.g. 25° C.) will vary with the particular food-acceptable acid. The pH of a particular solution containing equivalent amounts of calcium and phytic acid, i.e., six atoms of calcium per molecule of phytic acid, will vary with the concentration as well as the particular acid other than phytic.

To function satisfactorily in our invention, the edible acid used to dissolve calcium phytate, or the acid whose calcium salt is dissolved in an aqueous phytic acid solution, must meet three requirements. One, it must be appreciably soluble in water at room temperature, i.e., at least soluble to the extent of 5 parts (anhydrous basis) per 95 parts of water at 20° C.; two, it must have an ionization constant of at least $1\times10^{-4}$; and three, its least soluble calcium salt must be substantially more soluble in water than calcium phytate.

Solutions containing 50% dry substance and stable at room temperature are easily prepared by dissolving calcium phytate in hydrochloric acid and in ortho-phosphoric acid. In both instances, a minimum of about six moles of the acid per mole of calcium phytate is required. The solutions are quite acid, 0.7 pH with hydrochloric acid, and 1.5 pH with phosphoric acid. Somewhat less concentrated solutions, ranging from 30 to 40% dry substance, can be prepared by dissolving calcium phytate in water solutions of the organic acids. The pH of these solutions will range from about 1.7 for the stronger acids such as maleic, malonic, and tartaric to about 2.0 for the weaker ones such as citric, lactic, and malic. The same limitations apply to the solutions prepared by dissolving the calcium salts of the food acceptable acids in water solutions of phytic acid, provided the solutions contain about six atoms of calcium per molecule or phytic acid.

Our novel compositions are conveniently prepared, stored, and used in the form of aqueous solutions. If desired, however, the water can be removed by evaporation and a dry product thus obtained. Some of the products are rather hygroscopic, particularly those made by dissolving calcium chloride in phytic acid or calcium phytate in hydrochloric acid solutions.

Fruits and vegetables which are somewhat firm and not extremely juicy, such as potatoes, apples, rutabagas, celery, and lettuce, may be treated by dipping them in dilute solutions of our novel compositions. The peeled and/or cut products are immersed, for example, in a water solution of one of our novel compositions and then drained, packaged and frozen or placed in cold storage. Dipping for one minute in a solution containing one per cent of dissolved calcium phytate (1 lb. of calcium phytate per twelve gallons of solution) has proved highly effective in this application, but both immersion time and solution concentration may be adjusted to suit individual needs.

Juicy fruits, such as strawberries, raspberries, sliced peaches, and pitted cherries may be sprayed with a solution of our novel composition after being placed in the container and before the addition of sweetener.

The preparation of novel compositions of matter in accordance with our invention is illustrated by the following examples:

EXAMPLE 1

One mole of finely powdered calcium phytate (888 grams; 19% phytin phosphorous, 25% calcium) is added gradually with stirring to 2750 grams of 8% aqueous hydrochloric acid (6 moles) at room temperature, and stirring is continued for two hours. Only a very slight amount of material remains undissolved. The solution is then mixed with 25 grams of activated carbon, stirred 30 minutes, and filtered through paper. The nearly colorless solution is evaporated under reduced pressure to a weight of 2215 grams (50% dry substance). The clear solution thus obtained has a pH of 0.7 and is stable at 20–40° C., yielding no precipitate or cloudiness on prolonged storage.

Ten grams of the concentrated solution on a watch glass is dried in a vacuum desiccator over anhydrous magnesium perchlorate. The hygroscopic dry residue readily redissolves to a clear solution in an equal weight of cold water.

EXAMPLE 2

Three moles of calcium chloride (657 grams $$CaCl_2 \cdot 6H_2O)$$

is dissolved in 3000 grams of 22% aqueous phytic acid solution (1 mole) at room temperature. To this solution is then added gradually with stirring three moles of finely powdered calcium hydroxide (222 grams), and stirring is continued for two hours. Only a very slight amount of lime remains undissolved. The solution is mixed with 25 grams of activated carbon, stirred 30 minutes, and filtered through paper. The nearly colorless solution (0.7 pH) is evaporated under reduced pressure to a weight of 2215 grams (50% dry substance). The clear solution thus obtained is stable during prolonged storage at 20–40° C.

Ten grams of the concentrated solution on a watch glass is dried in a vacuum desiccator over anhydrous magnesium perchlorate. The hydroscopic dry residue readily redissolves to a clear solution in an equal weight of cold water.

EXAMPLE 3

Example 1 is repeated except for replacing the hydrochloric acid with 3920 grams of 15% aqueous orthophosphoric acid (6 moles). The decolorized solution at 1.5 pH is evaporated to a weight of 2950 grams (50% dry substance). The concentrated solution is stable during prolonged storage at 20–40° C.

Ten grams of the concentrated solution is dried on a watch glass in a vacuum desiccator over anhydrous magnesium perchlorate. The dry residue readily redissolves to a clear solution in an equal weight of cold water.

EXAMPLE 4

To 3000 grams of 22% aqueous phytic acid solution at room temperature (1 mole) is added with stirring 1032 grams of finely powdered dicalcium phosphate $$(CaHPO_4 \cdot 2H_2O$$

6 moles) and stirring is continued for 2 hours. Only a negligible amount of the calcium phosphate remains undissolved. The solution is mixed with 25 grams of activated carbon, stirred 30 minutes, and filtered through paper. Evaporation of the nearly colorless solution under reduced pressure to a weight of 2950 grams yields a stable solution of 50% solids at 1.5 pH.

Ten grams of the concentrated solution is dried on a watch glass in a vacuum desiccator over anhydrous magnesium perchlorate. The dry residue readily dissolves to a clear solution in an equal weight of cold water.

EXAMPLE 5

Example 1 is repeated except for replacing the hydrochloric acid with 5120 grams of a 15% aqueous citric acid solution (4 moles). The decolorized solution (1.9 pH) is evaporated to a weight of 4140 grams (40% dry substance), yielding a stable concentrated solution.

Ten grams of the concentrated solution is dried on a watch glass in a vacuum desiccator over anhydrous magnesium perchlorate. The dry residue redissolves readily to a clear solution in 2 parts of cold water.

EXAMPLE 6

Example 4 is repeated except for replacing the dicalcium phosphate with 1142 grams of finely powdered calcium citrate ($Ca_3C_{12}H_{10}O_{14} \cdot 4H_2O$, 2 moles). This yields a stable decolorized solution (1.9 pH), which is 40% solids without evaporation.

Ten grams of the 40% solution is dried on a watch glass in a vacuum desiccator over anhydrous magnesium perchlorate. The dry residue readily redissolves to a clear solution in 2 parts of cold water.

EXAMPLE 7

Example 1 is repeated except for replacing the hydrochloric acid with 5760 grams of 19 aqueous lactic acid solution (12 moles). This yields a stable decolorized solution (2.1 pH), which is 30% solids without evaporation.

Ten grams of the 30% solution is dried on a watch glass in a vacuum desiccator over anhydrous magnesium perchlorate. The dried residue readily redissolves to a clear solution in 3 parts of cold water.

EXAMPLE 8

To 4710 grams of 14% aqueous phytic acid solution (1 mole) at room temperature is added with stirring 1850 grams of finely powdered calcium lactate $$(CaC_6H_{10}O_6 \cdot 5H_2O$$

6 moles) and stirring is continued for 2 hours. The resulting solution is mixed with 25 grams of activated carbon, stirred for 30 minutes, and filtered through paper. The nearly colorless solution (2.1 pH) thus obtained is 30% dry substance and is stable at room temperature.

Ten grams of the 30% solution is dried on a watch glass in a vacuum desiccator over anhydrous magnesium perchlorate. The dry residue readily redissolves to a clear solution in 3 parts of cold water.

EXAMPLE 9

Example 1 is repeated except for replacing the hydrochloric acid with 7430 grams of 21.6 aqueous malic acid solution (12 moles). This yields a stable decolorized solution (2.0 pH), which is 30% dry substance without evaporation.

Ten grams of the 30% solution is dried on a watch

EXAMPLE 10

To 4400 grams of 15.0% aqueous phytic acid solution (1 mole) at room temperature is added with stirring 1250 grams of finely powdered calcium malate $$(CaC_4H_4O_5 \cdot 2H_2O$$

6 moles), and stirring is continued for 2 hours. The solution thus obtained is mixed with 25 grams of activated carbon and stirred 30 minutes. The stable, nearly colorless solution (2.0 pH) is 30% dry substance.

Ten grams of the 30% solution is dried on a watch glass in a vacuum desiccator over anhydrous magnesium perchlorate. The dry residue readily redissolves to a clear solution in 3 parts of cold water.

EXAMPLE 11

Example 1 is repeated except for replacing the hydrochloric acid with 5070 grams of 17.8% aqueous tartaric acid solution. This yields a stable decolorized solution (1.7 pH), which is 30% solids without evaporation.

Ten grams of the 30% solution is dried on a watch glass in a vacuum desiccator over anhydrous magnesium perchlorate. The dry residue readily redissolves to a clear solution in 3 parts of cold water.

EXAMPLE 12

To 4830 grams of 13.7% aqueous phytic acid solution (1 mole) at room temperature, is added with stirring 1561 grams of finely powdered calcium tartrate $(CaC_4H_4O_6 \cdot 4H_2O$, 6 moles) and stirring is continued for two hours. The resulting solution is mixed with 25 grams of activated carbon stirred 30 minutes, and filtered through paper. The nearly colorless stable solution (1.7 pH) is 30% solids.

Ten grams of the 30% solution is dried on a watch glass in a vacuum desiccator over anhydrous magnesium perchlorate. The dry residue readily redissolves to a clear solution in 3 parts of cold water.

EXAMPLE 13

Example 1 is repeated except for replacing the hydrochloric acid with 4150 grams of a 15% aqueous solution of malonic acid (6 moles), thus yielding a stable decolorized solution (1.9 pH) which is 30% solids without evaporation.

Ten grams of the 40% solution is dried on a watch glass in a vacuum desiccator over anhydrous magnesium perchlorate. The dry residue readily redissolves to a clear solution in 3 parts of cold water.

EXAMPLE 14

To 3755 grams of 17.6% aqueous phytic acid solution (1 mole) is added with stirring 1284 grams of finely powdered calcium malonate ($CaC_3H_2O_4 \cdot 4H_2O$, 6 moles), and stirring is continued for 2 hours. The resulting solution is mixed with 25 grams of activated carbon, stirred for 30 minutes, and filtered through paper. The nearly colorless filtrate (1.9 pH) is a stable solution containing 30% solids.

Ten grams of the 40% solution is dried on a watch glass in a vacuum desiccator over anhydrous magnesium perchlorate. The dried residue redissolves readily to a clear solution in 3 parts of cold water.

EXAMPLE 15

Example 1 is repeated except for replacing the hydrochloric acid with 3070 grams of 22.6% aqueous solution of maleic acid (6 moles), thus yielding a stable decolorized solution (1.7 pH) which is 40% solids without evaporation.

Ten grams of the 40% solution is dried on a watch glass over anhydrous magnesium perchlorate in a vacuum desiccator. The dry residue readily redissolves to a clear solution in 2 parts of cold water.

EXAMPLE 16

To 2390 grams of a 24.8% aqueous solution of phytic acid is added with stirring 1032 grams of finely powdered calcium maleate ($CaC_4H_2O_4 \cdot H_2O$, 6 moles), and stirring is continued for 2 hours. The resulting solution is mixed with 25 grams of activated carbon stirred for 30 minutes, and filtered through paper. The nearly colorless filtrate (1.7 pH) is a stable solution containing 40% solids.

Ten grams of the 40% solution is dried on a watch glass over anhydrous magnesium perchlorate in a vacuum desiccator. The dry residue readily redissolves to a clear solution in 2 parts of cold water.

The following procedures illustrate the use of our novel compositions of matter to inhibit the discoloration of cut fruits and vegetables when exposed to the air.

Procedure 1

Peeled Irish potatoes, cut for French fries, are immersed for 1 minute at room temperature in a dilute solution of one of our novel compositions, then drained. The solution is made by diluting one pound of the 50% solution of Example 1 with six gallons of water. The treated potatoes remain much lighter colored than control potatoes when exposed to the air and are correspondingly more attractive when fried.

This procedure may be used to inhibit the discoloration of trimmed celery, head lettuce, and rutabagas which frequently occurs. For example, when these vegetables are displayed in the grocery store. It can be used also to suppress the discoloration of peeled, cored, or sliced apples when they are exposed to the air.

Procedure 2

Sliced peaches, pitted cherries, and soft berries such as strawberries, which are too juicy to be dipped in a treating solution without loss of juice, can be sprayed or sprinkled with a solution of our novel compositions. For example, 28 pounds of sliced peaches are weighed into a 30 pound can and 4 ounces of a solution made by diluting 1 gallon of the 50% solution of Example 1 with 5.5 gallons of water is sprinkled over the fruit in the can. Two pounds of sweetener is then added to the fruit in the can. A control can of sliced peaches is prepared, omitting the calcium phytate solution. Both are frozen, stored for 60 days, and defrosted. The treated peaches retain their clear yellow color throughout the can, whereas the surface layer of the control can are dark brown. The discolored layer in the control can contains about 3 pounds, or 10%, of off-grade product.

In Procedure 1, the immersion time and solution concentration may be adjusted as required to fit particular needs. Likewise, in Procedure 2, the solution concentration and dosage may be varied as required to accommodate particular products. Obviously, the amount of composition retained on materials treated by Procedure 1 will vary with the concentration of treating solution and immersion time. This poses no difficulty of application because the amount or proportion of retained composition is not critical. Any significant amount is beneficial. We have found that the beneficial results obtained by Procedure 1 generally plateau at 1 to 2% concentration, but, as pointed out previously, higher concentrations can be used if desired or necessary. The same general considerations apply to Procedure 2.

As used herein, the expression "cut surfaces" means any uncovered surface from which natural juices may escape. The "cut surface" may be produced, for example, by mechanical or chemical peeling, by mechanical coring or trimming, by crushing or bruising during picking, handling, and transporting.

Commercial grades of calcium phytate are satisfactory for use in our invention, provided they do not contain toxic impurities. It is unnecessary that the calcium phytate be chemically pure or contain the theoretical contents of calcium and phosphorous for the hexa calcium salt of phytic acid. It is obvious that the acid calcium salts of phytic acid, consisting of phytic acid neutralized with less than six moles of calcium base, can also be used in our invention.

The following table lists the equivalents of edible acid per mol of calcium phytate (i.e., per 888 grams of dry calcium phytate containing 25% by weight calcium and 19% by weight phytin phosphorous) in the foregoing examples. For those examples based on dissolving the calcium salt of an edible acid in aqueous phytic acid, the table lists the calculated equivalents of free edible acid.

| Example | Equivalents Edible Acid | Example | Equivalents Edible Acid | Example | Equivalents Edible Acid |
| --- | --- | --- | --- | --- | --- |
| 1 | 6 | 6 | 6 | 11 | 12 |
| 2 | 6 | 7 | 12 | 12 | 12 |
| 3 | 6 | 8 | 6 | 13 | 12 |
| 4 | 18 | 9 | 24 | 14 | 12 |
| 5 | 12 | 10 | 12 | 15 | 12 |
|  |  |  |  | 16 | 12 |

The range of equivalents of edible acid per mol of calcium phytate in the examples is 6 to 24.

We claim:
1. The process of inhibiting the discoloration of cut fruits and vegetables on exposure to air which comprises applying to the cut surfaces thereof a discoloration-inhibiting amount of a composition consisting essentially of a water solution of calcium ion, phytate anion, and the anion of an edible water-soluble acid other than phytic acid wherein the ratio of gram atoms of calcium to equivalents of phytate is about 2, the ratio of gram atoms of calcium to equivalents of said non-phytate anion lies within the range of about 1 to about 4, the pH of said solution lies within the range of about 0.7 to about 2.1, said non-phytate anion being derived from the group of acids consisting of hydrochloric, orthophosphoric, citric, lactic, malic, malonic, and maleic acids.

2. The process of inhibiting the discoloration of cut fruits and vegetables on exposure to air which comprises applying to the cut surfaces thereof a discoloration-inhibiting amount of an aqueous composition prepared by dissolving calcium phytate in an aqueous solution of an edible acid selected from the group consisting of hydrochloric, orthophosphoric, citric, lactic, malic, malonic, and maleic acids, said composition having a pH lying within the range of about 0.7 to about 2.1, a ratio of gram atoms of calcium to equivalents of said edible acid lying within the range of about 1 to about 4, and a ratio of gram atoms of calcium to equivalents of calcium phytate of about 2.

3. The process of inhibiting the discoloration of cut fruits and vegetables on exposure to air which comprises applying to the cut surfaces thereof a discoloration-inhibiting amount of an aqueous composition prepared by dissolving the calcium salt of an acid selected from the group consisting of hydrochloric, orthophosphoric, citric, lactic, malic, malonic, and maleic acids in an aqueous solution of phytic acid, said aqueous composition having a pH lying within the range of about 0.7 to about 2.1, a ratio of gram atoms of calcium to equivalents of said calcium salt lying within the range of about 1 to about 3, and a ratio of gram atoms of calcium to equivalents of phytic acid of about 2.

4. The process of inhibiting the discoloration of cut fruits and vegetables on exposure to air which comprises applying to the cut surfaces thereof a discoloration-inhibiting amount of an aqueous composition prepared by dissolving calcium hydroxide and calcium chloride in an aqueous solution of phytic acid, wherein the mol proportion of calcium hydroxide, calcium chloride and phytic acid is about 1–3–3 respective, said composition having a pH of about 0.7.

References Cited in the file of this patent
UNITED STATES PATENTS

| | | |
| --- | --- | --- |
| 2,564,106 | Gribbins et al. | Aug. 14, 1951 |
| 2,599,341 | McDermott | June 3, 1952 |
| 2,628,905 | Antle et al. | Feb. 17, 1953 |
| 2,738,280 | Makower | Mar. 13, 1956 |
| 2,874,059 | Powers et al. | Feb. 17, 1959 |

OTHER REFERENCES

Abstract No. 174,793, filed by Cohee, July 19, 1950. (650 O.G. 895 published Sept. 18, 1951.)

"Food Industries," March 1951, pp. 91–93.

UNITED STATES PATENT OFFICE
CERTIFICATE OF CORRECTION

Patent No. 2,987,401            June 6, 1961

Carter D. Johnston et al.

It is hereby certified that error appears in the above numbered patent requiring correction and that the said Letters Patent should read as corrected below.

Column 2, line 67, for "or" read -- of --; column 3, line 61, for "hydroscopic" read -- hygroscopic --; column 5, line 2, for "Thus" read -- This --; column 6, line 5, for "2390" read -- 2930 --.

Signed and sealed this 31st day of October 1961.

(SEAL)
Attest:

ERNEST W. SWIDER
Attesting Officer

DAVID L. LADD
Commissioner of Patents
USCOMM-DC